United States Patent
Baurer et al.

(10) Patent No.: US 7,350,090 B2
(45) Date of Patent: Mar. 25, 2008

(54) ENSURING POWER AVAILABILITY TO A BLADE SERVER WHEN BLADE MANAGEMENT CONTROLLER IS CORRUPTED

(75) Inventors: Phil Baurer, Leander, TX (US); Bryan Krueger, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 11/247,725

(22) Filed: Oct. 11, 2005

(65) Prior Publication Data

US 2007/0083774 A1 Apr. 12, 2007

(51) Int. Cl.
*G06F 1/26* (2006.01)
(52) U.S. Cl. .............. 713/300; 713/310; 713/320; 713/323; 714/1; 714/14; 714/22; 714/36
(58) Field of Classification Search .......... 713/300
See application file for complete search history.

(56) References Cited

U.S. PATENT DOCUMENTS 6,502,203 B2* 12/2002 Barron et al. ............... 714/4
6,976,112 B2* 12/2005 Franke et al. .............. 710/302
7,051,215 B2* 5/2006 Zimmer et al. ............. 713/300
2004/0003303 A1* 1/2004 Oehler et al. .............. 713/300
2006/0230299 A1* 10/2006 Zaretsky et al. ............ 713/320
2007/0047195 A1* 3/2007 Merkin et al. .............. 361/685

OTHER PUBLICATIONS

US 7,278,054, 10/2007, Davies et al. (withdrawn)*

* cited by examiner

*Primary Examiner*—Nitin C. Patel
(74) *Attorney, Agent, or Firm*—Baker Botts L.L.P.

(57) ABSTRACT

An information handling system having a plurality of blade server modules (BSMs) and power supply units (PSUs) uses a module monitor board (MMB) to monitor and control a power budget of the PSUs by each individual BSM requesting authorization from the MMB in order to power ON and boot-up. A blade management controller (BMC) may communicate with the MMB over a communications bus. However, if the firmware application controlling the BMC has been corrupted the BMC it may run in a "boot block" mode and not contain the intelligence necessary to obtain power ON authorization from the MMB. A single, existing input-output (I/O) line from the MMB to the BMC may be utilized to indicate power ON authorization for the respective BSM. The MMB and BMC may be adapted for preventing the BSM from powering ON without proper authorization from the MMB and that the BMC will always power ON the BSM when enough power is available from the PSU. A dual-use of the I/O line may be used for providing a pseudo-communications channel between the MMB and the BMC when the BMC may be in the BOOT BLOCK mode.

19 Claims, 5 Drawing Sheets

ENSURING POWER AVAILABILITY TO A BLADE SERVER WHEN BLADE MANAGEMENT CONTROLLER IS CORRUPTED

TECHNICAL FIELD

The present disclosure relates generally to information handling systems and, more particularly, to ensuring power availability to a blade server when blade management controller is corrupted.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

An information handling system is powered from a power supply system that receives and converts alternating current (AC) power to direct current (DC) power at utilization voltages required by the electronic modules comprising the information handling system. The power supply system tightly regulates these utilization voltages and incorporates over current protection for each of the voltages. To further provide increased reliability of the power supply system, a plurality of power supply units (PSUs) may be provided and coupled in parallel so that the loss or malfunction of one or more of the PSUs will not totally disable operation of the information handling system.

Blade server modules, or "blades," are miniaturized server modules that typically are powered from a common power supply system and are cooled by a cooling system within a multi-server cabinet. Typically, a blade includes a circuit board with one or more processors, memory, a connection port, and possibly a disk drive for storage. By arranging a plurality of blades like books on a shelf in the multi-server cabinet, a high density multi-server system achieves significant cost and space savings over a plurality of conventional servers. These savings result directly from the sharing of common resources, e.g., power supplies, cooling systems, enclosures, etc., and the reduction of space required by this type of multi-server system while providing a significant increase in available computer processing power.

SUMMARY

An information handling system may be comprised of a plurality of blade server modules (BSMs) and one or more PSUs enclosed in a blade server chassis. The plurality of BSMs may be coupled to the one or more PSUs through a power distribution board (PDB) in a blade server chassis. A single chassis controller, e.g., module monitor board (MMB), may monitor and control a power budget of the one or more PSUs. The power budget may be managed through the chassis controller, e.g., MMB, by each individual BSM requesting authorization from the MMB in order to power-up (power ON). Power ON authorization has to occur before a BSM host processor may boot-up. A blade management controller (BMC) may communicate with the chassis controller (MMB) over a communications bus.

A problem exists, however, if the firmware application controlling the BMC has been corrupted. Corruption of the BMC firmware application may occur in various ways, e.g., the result of a failed firmware update procedure. Corruption of the BMC firmware application typically causes the BMC to run in a "boot block" mode, where only minimal features are present to allow application firmware to be programmed. These minimal features (capabilities) may not allow the BSM to communicate with the chassis controller (MMB) for obtaining power ON authorization. Typically, there is not enough memory capacity in an existing "boot block" sector of Flash memory to add a communications protocol. Also, it may be undesirable to add complexity to the boot block since any firmware "bugs" at the boot block level cannot be fixed in the field.

Therefore, when the BMC firmware application is corrupted, the boot block may not contain the intelligence necessary to obtain power ON authorization from the chassis controller (MMB). This may cause at least one undesirable result. 1) The "boot block" may power ON the BSM without authorization, but having multiple BSMs power ON may exceed the PSU power budget capacity, resulting in an overcurrent condition that may shut down the entire blade server chassis. If a BSM is not allowed to power ON, it must be returned to the manufacturer since there is no way to program the BSM without powering it up. If a BSM must be powered up, it would have to be physically removed from the blade server chassis, a hardware jumper installed so as to bypass the BMC and connect the power-on button directly to the I/O controller hub (ICH).

According to a specific example embodiment of this disclosure, an information handing system comprises a blade server module, wherein the blade server module has a blade management controller that controls power on of the blade server module; a power supply unit; and a module monitor board, wherein the module monitor board monitors a power budget for the power supply unit by giving permission to the blade management controller before the blade server module is powered-up, wherein the blade management controller requests permission from the module monitor board for powering up the blade server module unless the blade management controller cannot communicate with the module monitor board over a first control bus, whereby the module monitor board gives the blade management controller permission to power-up the blade server module over a second control bus if there is sufficient power remaining in the power budget, otherwise the module monitor board does not give the blade management controller permission to power-up the blade server module.

According to another specific example embodiment of this disclosure, a method for controlling power-up of a blade service module in an information handling system comprises determining when a new blade server module is installed in the information handling system; determining whether a module monitor board can communicate with a blade module controller over a first control bus, wherein if the module monitor board can communicate with the blade module controller over the first control bus then continue normal processing, and if the module monitor board cannot communicate with the blade module controller over the first control bus then assume that the new blade server module will power-up, determine whether there is enough power available to power-up the new blade server module, if there is not enough power available to power-up the new blade server module then assume that the new blade server module will remain off and continue normal processing, if there is enough power available to power-up the new blade server module then send a power-up pulse from the module monitor board to the blade module controller over a second control bus, and update module monitor board power budget table to indicate that the new blade server module has powered-up; and continue normal processing.

BRIEF DESCRIPTION OF THE DRAWINGS

A more complete understanding of the present disclosure thereof may be acquired by referring to the following description taken in conjunction with the accompanying drawings wherein.

Figure 1:
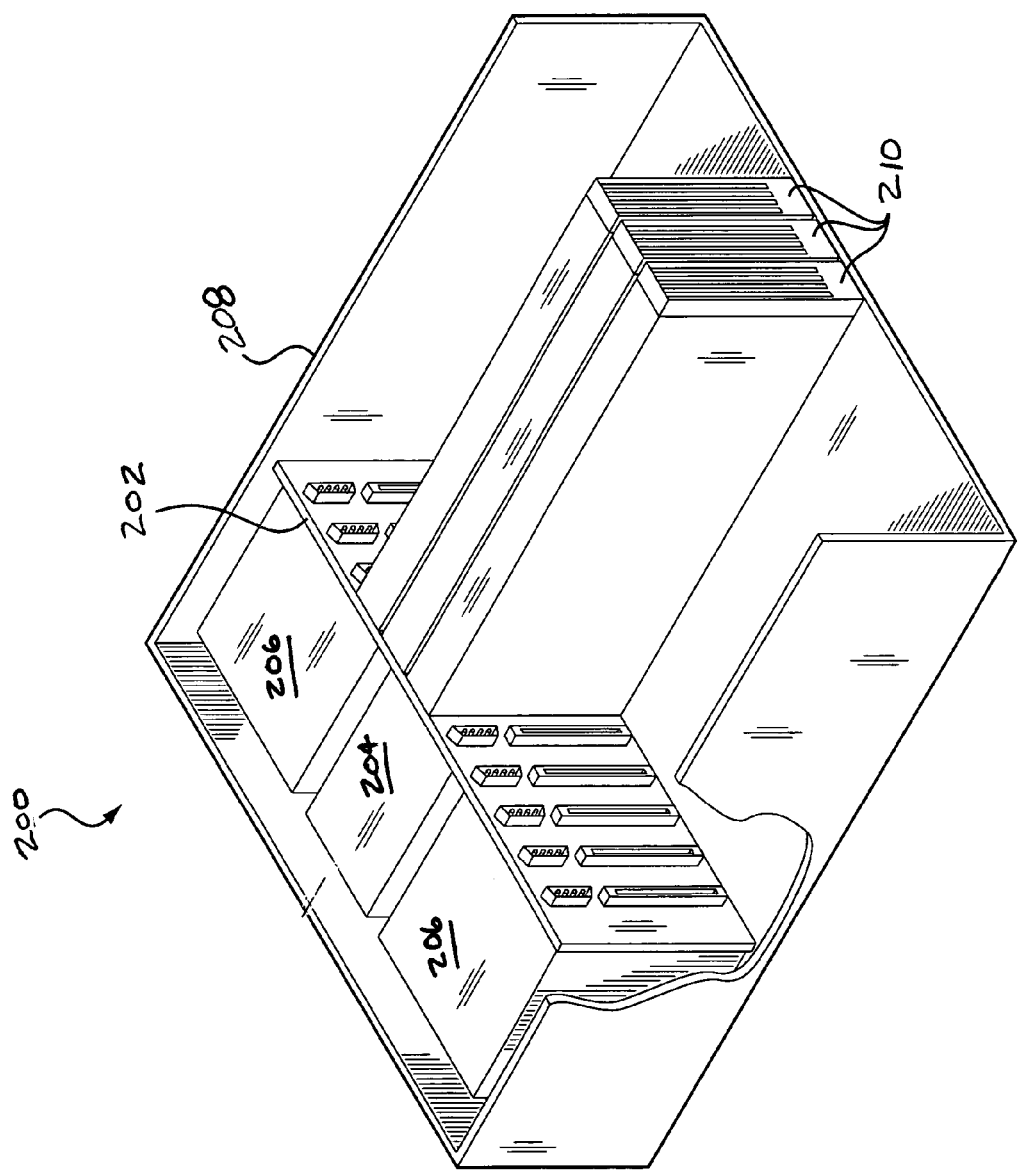
FIG. 1 is a schematic perspective view of an information handling server system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of specific example embodiments of the present invention are schematically illustrated. Like elements in the drawings will be represented by like numbers, and similar elements will be represented by like numbers with a different lower case letter suffix.

Referring to FIG. 1, depicted is a schematic perspective view of an information handling server system, according to a specific example embodiment of the present disclosure. The information handling server system, generally represented by the numeral 200, comprises at least one blade server module (BSM) 210, a power distribution board (PDB) 202, at least one power supply unit (PSU) 206 and a module monitor board (MMB) 204. In certain embodiments, one example of an information handling server system 200 includes a high density server system 200 that may form a part of a component rack system (not expressly shown). Typically, the high density server system 200 may include an enclosure or chassis 208 in which the at least one PSU 206, MMB 204, PDB 202 and the at least one BSM 210 may be enclosed therein. Each BSM 210 may include a blade management controller (BMC) 212 (see FIG. 2).

Although FIG. 1 depicts a mid-plane PDB 202 as being placed between MMB 204 and the at least one BSM 210, the PDB 202 may be located anywhere in the information handling system 200, even external to the chassis 208. In alternate embodiments, the PDB 202 may be located along the back of the information handling server system 200 and may be referred to as a power distribution back-plane (not shown).

Typically, the information handling system 200 may include more than one PSU 206 such that a redundant power source may be provided. The PSU 206 may supply an output, e.g., an electrical voltage(s) for the at least one BSM 210. Generally, the PSU 206 output is coupled through the PDB 202 for distribution to the at least one BSM 210.

Figure 2:
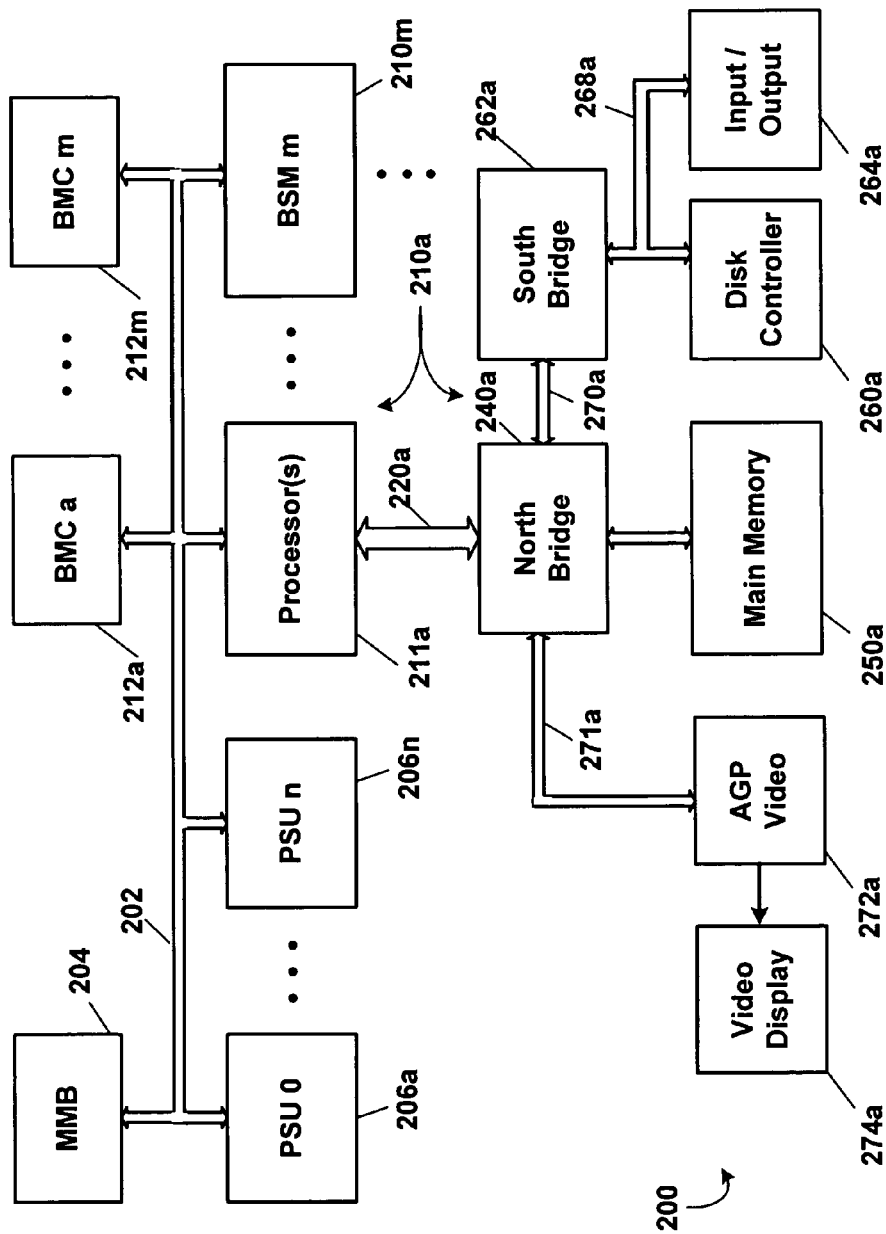
FIG. 2 is a schematic block diagram of an information handling server system, according to a specific example embodiment of the present disclosure.

Referring to FIG. 2, depicted is an information handling server system having electronic components mounted on at least one printed circuit board (PCB) (motherboard not shown) and communicating data and control signals therebetween over signal buses. In one example embodiment, the information handling server system is a computer blade server system. The information handling server system, generally referenced by the numeral 200, may comprise one or more blade server modules (BSMs) 210*a*-210*m*. For each of the blade server modules (BSMs) 210*a*-210*m* (for illustrative purposes only components for BSM 210*a* are shown) there may be a processor(s) 211*a*, a north bridge 240*a*, which may also be referred to as a memory controller hub or a memory controller, and is coupled to a main system memory 250*a*. The north bridge 240*a* is coupled to the processor(s) 210*a* via the host bus 220*a*. The north bridge 240*a* is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 240a. The chip set may also be packaged as an application specific integrated circuit (ASIC). The north bridge 240a typically includes functionality to couple the main system memory 250a to other devices within the information handling system 100. Thus, memory controller functions such as main memory control functions typically reside in the north bridge 240a. In addition, the north bridge 240a provides bus control to handle transfers between the host bus 220a and a second bus(es), e.g., PCI bus 270a, AGP bus 271a that may be coupled to a video graphics interface 272a which is adapted to drive a video display 274a. A third bus(es) 268a may also comprise other industry standard buses or proprietary buses, e.g., ISA, SCSI, I²C, SPI, USB buses through a south bridge(s) (bus interface) 262a. A blade module controller (BMC) 212 may request power ON for a respective BSM 210.

Figure 3:
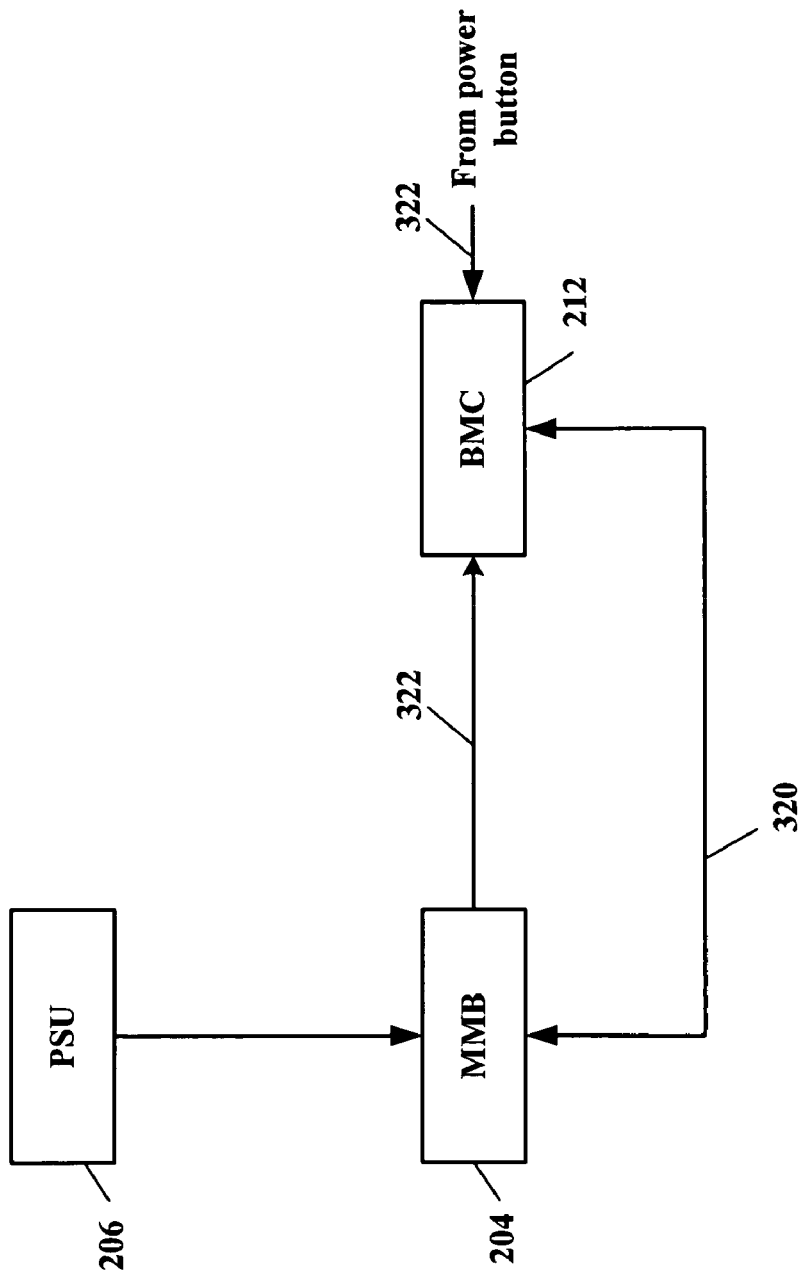
FIG. 3 is a schematic block diagram of a chassis and blade controller interface, according to a specific example embodiment of the present disclosure.

Referring now to FIG. 3, depicted is a schematic block diagram of a chassis and blade controller interface, according to a specific example embodiment of the present disclosure. A single, existing input-output (I/O) line 322 from the MMB 204 to the BMC 212 may be utilized to indicate power ON authorization for the respective BSM 210. The MMB 204 and BMC 212 may be adapted for preventing the BSM 210 from powering ON without proper authorization from the MMB 204, and that the BMC 212 will always power ON the BSM 210 when enough power is available from the PSU 206. For example, the I/O line 322 may be one of the signal lines in a general purpose input-output (GPIO) from the MMB 204 to the BMC 212. The normal control bus 320 may be an intelligent platform management bus (IPMB) (I²C bus) having a control signal, e.g., IPMB_RESET and the like.

However, the functionality of the IPMB 320 may not be available if the BMC 212 is in a BOOT BLOCK mode. Thus, a BSM 210 may be powered ON even if the BMC 212 has been corrupted and may be in a BOOT BLOCK mode. Even though the BMC 212 may not have a communications link (bus 320) to the MMB 204 in the BOOT BLOCK mode, the BSM 210 will not cause the PSU power budget to be exceeded. Therefore, no further user and/or hardware intervention may be required for powering ON the BSM 210 when sufficient power is available or for preventing power ON of the BSM 210 when sufficient power is not available. A dual-use of the I/O line 322 may be used for providing a pseudo-communications channel between the MMB 204 and the BMC 212 when the BMC 212 may be in the BOOT BLOCK mode, in combination with simple hardware and/or software logic to avoid having to depend upon user intervention and/or possibly exceeding the power budget of the PSU 206.

Figure 4:
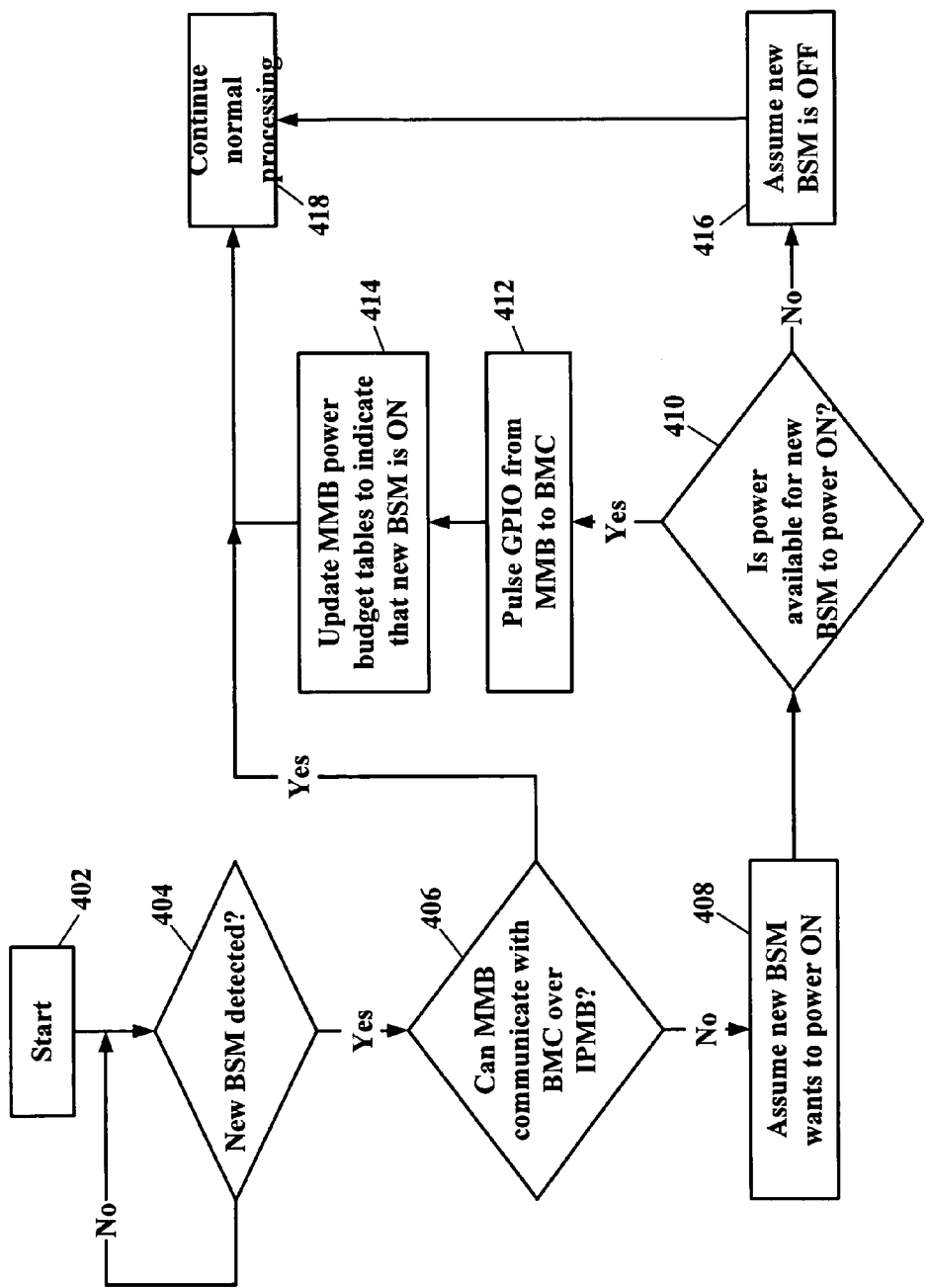
FIG. 4 is a schematic flow diagram of the operation of a chassis controller (MMB), according to a specific example embodiment of the present disclosure.

Referring now to FIG. 4, depicted is a schematic flow diagram of the operation of a chassis controller (MMB) 204, according to a specific example embodiment of the present disclosure. Step 402 starts a chassis controller program of the MMB 204. In step 404 the MMB 204 detects when a new BSM 210 is inserted into the chassis 202 (FIG. 1). Step 406 determines whether the MMB 204 can communicate with the BMC 212, e.g., over the IPMB 320. If the MMB 204 can communicate with the BMC 212, then normal processing continues in step 418.

However, if the MMB 204 cannot communicate with the BMC 212, then in step 408 an assumption is made that the newly detected BSM 210 (step 404) wants to power ON and the power budget thereof is set at a worst-case power requirement. Step 410 checks if sufficient power from the PSU 206 is available to power ON the newly detected BSM 210. If there in not sufficient power from the PSU 206 to power ON the newly detected BSM 210, then in step 416 the newly detected BSM 210 is assumed to be OFF and no authorization is given for the newly detected BSM 210 to be powered ON. Thereafter normal processing continues in step 418.

If there is sufficient power from the PSU 206 to power ON the newly detected BSM 210, then in step 412 a pulse is send from the MMB 204 over the I/O line 322, e.g., GPIO, to the BMC 212. Then in step 414 the MMB power budget tables are updated to indicate that the newly detected BSM 210 is ON. Thereafter normal processing continues in step 418.

Figure 5:
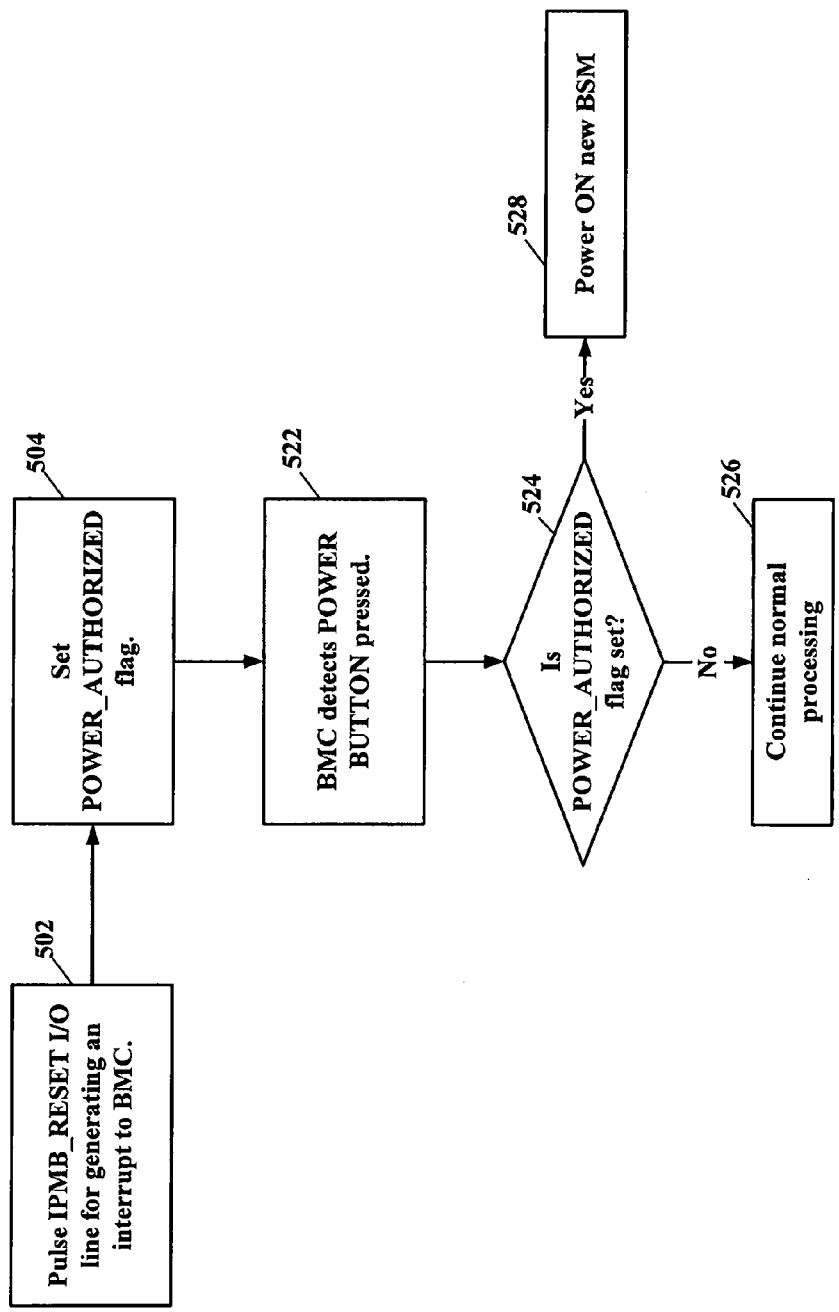
FIG. 5 is a schematic flow diagram of the operation of a blade module controller (BCM), according to a specific example embodiment of the present disclosure.

Referring now to FIG. 5, depicted is a schematic flow diagram of the operation of a blade module controller (BMC), according to a specific example embodiment of the present disclosure. The following steps may be added to the boot block code of the BMC 212. In step 502, the IPMB_RESET I/O line is pulsed to generate an interrupt to the BMC 212. In step 504 the POWER_AUTHORIZED flag is set upon receiving the pulse on the IPMB_RESET I/O line. In step 522, when the BMC 212 detects a POWER BUTTON being pressed, step 524 will check if the POWER_AUTHORIZED flag has been set. If so the newly detected BSM 210 will power ON in step 528. If the POWER_AUTHORIZED flag has not been set then normal processing continues and the newly detected BSM 210 will not be powered ON.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An information handing system, said system comprising:
   a blade server module, wherein the blade server module has a blade management controller that controls power on of the blade server module;
   a power supply unit; and
   a module monitor board, wherein the module monitor board monitors a power budget for the power supply unit by giving permission to the blade management controller before the blade server module is powered-up,
      wherein the blade management controller requests permission from the module monitor board for powering up the blade server module unless the blade management controller cannot communicate with the module monitor board over a first control bus,
      whereby the module monitor board gives the blade management controller permission to power-up the blade server module over a second control bus if there is sufficient power remaining in the power budget, otherwise the module monitor board does not give the blade management controller permission to power-up the blade server module.

2. The information handing system according to claim 1, further comprising a plurality of blade server modules, wherein each of the plurality of blade server modules has a blade management controller.

3. The information handing system according to claim 1, further comprising a plurality of power supply units.

4. The information handing system according to claim 1, wherein the first control bus is a bidirectional control bus.

5. The information handing system according to claim 1, wherein the first control bus is an I²C bus.

6. The information handing system according to claim 1, wherein the first control bus is an intelligent platform management bus.

7. The information handing system according to claim 6, wherein an IPMB_RESET control signal is used to indicate permission to power on the new blade server module.

8. The information handing system according to claim 1, wherein the second control bus is a general purpose input-output bus.

9. The information handing system according to claim 8, wherein the second control bus is a unidirectional control bus.

10. A method for controlling power-up of a blade service module in an information handling system, said method comprising the steps of:
   determining when a new blade server module is installed in the information handling system;
   determining whether a module monitor board can communicate with a blade module controller over a first control bus, wherein
      if the module monitor board can communicate with the blade module controller over the first control bus then continue normal processing, and
      if the module monitor board cannot communicate with the blade module controller over the first control bus then
      assume that the new blade server module will power-up,
      determine whether there is enough power available to power-up the new blade server module,
      if there is not enough power available to power-up the new blade server module then assume that the new blade server module will remain off and continue normal processing,
      if there is enough power available to power-up the new blade server module then send a power-up pulse from the module monitor board to the blade module controller over a second control bus, and
      update module monitor board power budget table to indicate that the new blade server module has powered-up; and
   continue normal processing.

11. The method according to claim 10, wherein the first control bus is a bidirectional control bus.

12. The method according to claim 10, wherein the first control bus is an I²C bus.

13. The method according to claim 10, wherein the first control bus is an intelligent platform management bus.

14. The method according to claim 13, wherein an IPMB_RESET control signal is used to indicate permission to power-up the new blade server module.

15. The method according to claim 10, wherein the second control bus is a general purpose input-output bus.

16. The method according to claim 15, wherein the second control bus is a unidirectional control bus.

17. The method according to claim 14, wherein the IPMB_RESET control signal is a pulse that generates an interrupt to the blade module controller.

18. The method according to claim 17, wherein the IPMB_RESET control signal pulse causes a POWER_AUTHORIZED flag to be set.

19. The method according to claim 18, wherein the step of powering up the new blade server module comprises the steps of:
   detecting a power button actuation;
   determining whether the POWER_AUTHORIZED flag is set,
      if so then powering up the new blade server module, and if not,
      then not powering up the new blade server module.

* * * * *